United States Patent [19]
Buckler

[11] Patent Number: 6,105,034
[45] Date of Patent: Aug. 15, 2000

[54] NON-VOLATILE MISSION-READY DATABASE FOR SIGNALING TRANSFER POINT

[75] Inventor: Craig L. Buckler, Apex, N.C.

[73] Assignee: Nortel Networks Corporation, Canada

[21] Appl. No.: 08/989,633

[22] Filed: Dec. 12, 1997

[51] Int. Cl.[7] ................................ G06F 6/00; G06F 9/00
[52] U.S. Cl. ............................................. 707/103; 707/10
[58] Field of Search ................................. 707/1–204, 103

[56] References Cited

U.S. PATENT DOCUMENTS

| | | | |
|---|---|---|---|
| 4,839,640 | 6/1989 | Ozer et al. | 340/825.31 |
| 5,758,359 | 5/1998 | Saxon | 707/204 |

*Primary Examiner*—Thomas G. Black
*Assistant Examiner*—John G. Mills

*Attorney, Agent, or Firm*—Finnegan, Henderson, Farabow, Garrett & Dunner, L.L.P.

[57] ABSTRACT

A Signaling Transfer Point (STP) has a Host complex with non-volatile storage and a processor coupled to a plurality of Network payload processors, each of which has a volatile memory. The STP restores a database of the non-volatile Host to the volatile memory of the plurality of processors after a power interruption or any event requiring reloading or refreshing of the database. Host and Payload processor databases each have a data structure, which is a balanced binary red-black tree, and a cell manager, which provides allocation and direct access to the cells of the binary tree. In an event requiring a reload or refresh of the database, the memory manager of the Host process and the memory manager of the requesting payload processor transmit the Host database to the payload processor in the form as stored on the volatile memory.

12 Claims, 5 Drawing Sheets

NON-VOLATILE MISSION-READY DATABASE FOR SIGNALING TRANSFER POINT

BACKGROUND OF THE INVENTION

The present invention relates generally to database management in a signaling transfer point (STP) for a common channel signaling network, and more particularly to a method for restoring data in a payload processor database of an STP.

Common Channel Signaling (CCS) provides a dedicated supervisory network for segregating signaling information from voice and data information in a telecommunications network. CCS was developed to meet the increased demands placed on the public telecommunications network by the growing market for voice, data, and information services. Previous signaling systems sent call setup and routing information over the same trunk circuit used for voice transmission. With CCS, a single out-of-band channel conveys signaling information relating to call setup, routing, and network management, among other things. Signaling System No. 7(SS7), an international protocol standard for CCS communications, creates a universal format for communicating signaling information in a CCS network (CCS7).

CCS7 networks also provide numerous advanced features for telecommunications users. By enabling communication between processors in central offices, CCS7 permits on-line or external databases to be queried. This capability opens access to such features as network-wide automated calling card service, Advanced Intelligent Network-based residential and business services, Custom Local Area Signaling Services, and Virtual Private Networking. Other advantages provided by CCS7 include Calling Number/Name Delivery and Automatic Callback to work across an entire network rather than just between subscribers served by the same central office.

Signaling transfer points (STPs) provide a key function in processing the signaling used in telecommunications. Large embedded databases, such as payload databases, have become major components in the architecture of telecommunications switches "payload database" and "real time database" refer to the same entity throughout. Payload databases used in STPs are embedded databases accessible to processing logic along a payload path. These databases store tens of thousands, even millions, of data entries for use in processing network traffic and must permit high-speed retrieval of the data by the system.

A critical aspect of STPs for SS7 networks is the speed of recovery after a failure occurs or upon start-up. STPs are key components of large telecommunications networks. Consequently, reducing the time that an STP is out of service is a major factor in the marketability and usefulness of the equipment.

The high-speed storage and retrieval required for payload databases necessitates their storage in random access memory (RAM). RAM, however, will lose its memory contents if its power is interrupted. If power is interrupted, either at start-up or at a failure, the STP must either reestablish the contents of the payload databases or preserve the database content prior to the start-up or failure.

Conventional approaches to preserving or restoring a payload database after failure or start-up have several drawbacks. One approach uses non-volatile random access memory (NV-RAM) on the network payload processor card to preserve the contents of the payload database. If power is lost, the NV-RAM still stores the payload database and can help in rapidly returning the payload processor card to operability. NV-RAM, however, is currently an order of magnitude more expensive than dynamic random access memory (DRAM), which cannot preserve data after losing its power.

A second approach to preserving or restoring a payload database uses a software algorithm to extract the necessary data from a persistent, human-accessible database and download the extracted data to the DRAM that stores the payload database. This second approach, however, must extensively transform the data from the human-accessible database in order to attain the high-speed embedded form necessary for the payload database.

In light of the foregoing, there is a need for a method and system for restoring a database to a payload processor after a power interruption, or any event requiring a reloading or a refreshing of the database, that is relatively inexpensive to manufacture and does not require the extended transformation time.

SUMMARY OF THE INVENTION

Accordingly, the system and method consistent with the present invention restores a database to a payload processor having a signal transfer point that transfers a "binary tree-based" database from a non-volatile host memory device to a volatile payload memory.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve these and other advantages, and in accordance with the purpose of the invention as embodied and broadly described herein, a signaling transfer point (STP) for use in a common channel signaling network consistent with the present invention includes a host processor and a plurality of network payload processors coupled to the host processor via internal communication pathways. A mission-ready database is stored in a non-volatile memory device and is accessible to the host processor. Each one of the plurality of payload processors has an accessible payload database. The mission-ready database and each payload database includes a balanced binary tree and are logically equivalent in form and content "mission-ready database" and "host database" refer to the same entity throughout. The database accessible to the host processor is stored in a non-volatile memory, and each payload database accessible to its associated payload processor is stored in a volatile memory. A memory manager is included in the host processor and each of the payload processors for initializing the database and providing efficient allocation of available memory. A separate utility transfers the database from the host database to the network payload databases.

In another aspect, a method of starting an STP having a host processor and a plurality of network payload processors coupled to the host processor consistent with the invention includes the steps of storing a database having a balanced binary tree format in a non-volatile memory of the host processor, applying power to the host processor and each of the plurality of payload processors, initializing each of the host and payload processors locally to enable the processors to perform steps necessary to get the entire network system to function as a whole, requesting, by each of the plurality of enabled payload processors, from the enabled host processor, a copy of the database stored in the non-volatile memory of the host processor, reading by the host processor the database from the non-volatile memory and transmitting it to the requesting payload processor, in the exact form stored in the non-volatile memory, and storing the copy of the database in the volatile memory of the requesting payload processor.

In still another aspect, the invention is a method of restoring database information to a payload processor coupled to a host processor of a Signal Transfer Point. The method comprises the steps of storing a database having a balanced binary tree format in a non-volatile memory of the host processor, applying power to the payload processor, initializing the payload processor locally to enable the payload processor to perform steps necessary to get the payload processor to function as a whole, requesting, by the payload processor, from the host processor a copy of the database stored in the non-volatile memory of the host processor, reading by the host processor the database from the non-volatile memory and transmitting it to the payload processor in the exact form stored in the non-volatile memory, and storing the transmitted copy of the database in the volatile memory of the payload processor.

Both the foregoing general description and the following detailed description are exemplary and explanatory only, and do not restrict the invention as claimed.

BRIEF DESCRIPTION OF THE DRAWINGS

The accompanying drawings, which are incorporated in and constitute a part of this specification, illustrate one embodiment of the invention and together with the description, explain the principles of the invention.

DESCRIPTION OF THE PREFERRED EMBODIMENT

Reference will now be made in detail to the present preferred embodiment consistent with the invention. Wherever possible and practical, the same reference numbers will be used throughout the drawings to refer to the same or like parts.

Figure 1:
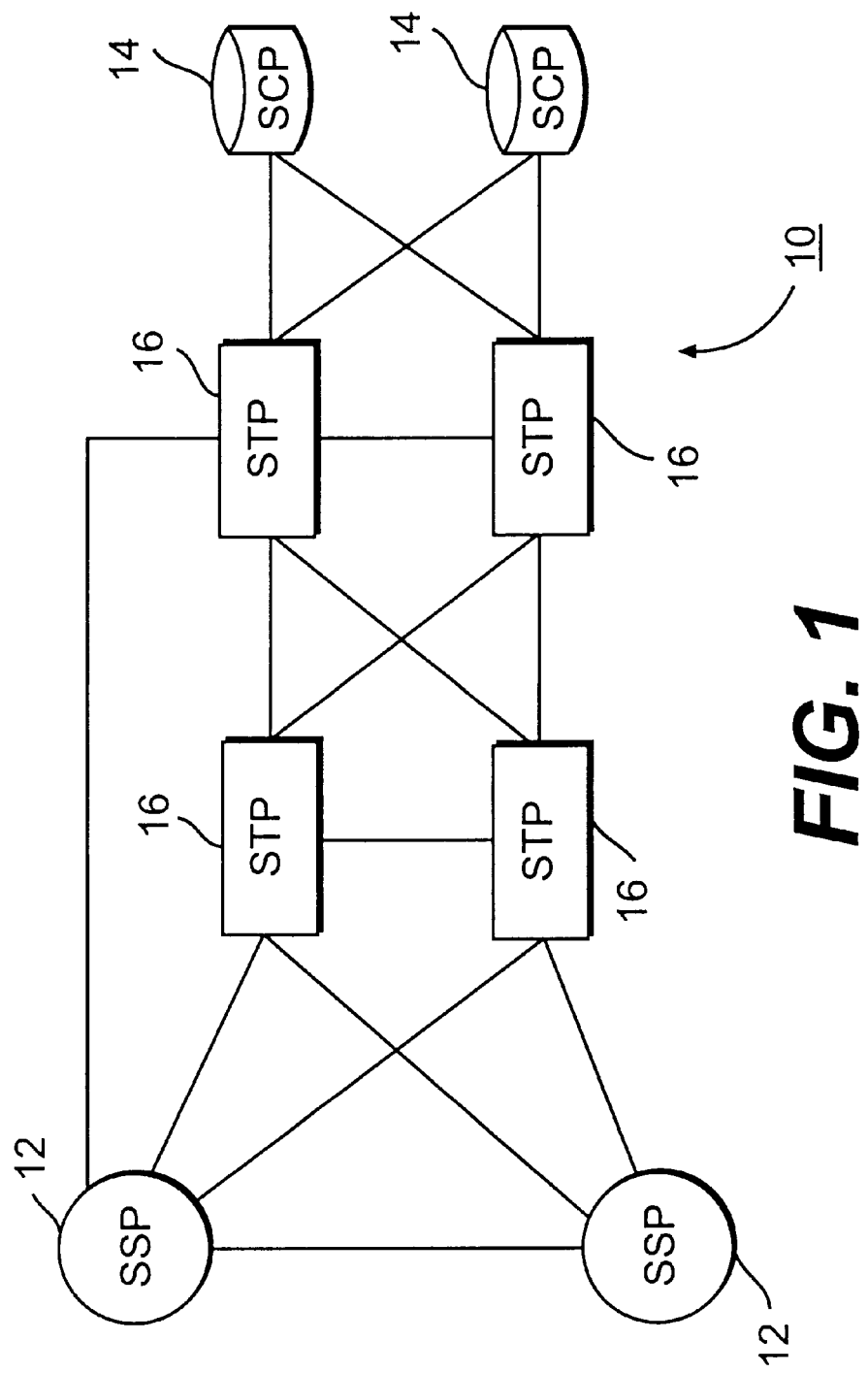
FIG. 1 is a block diagram of a common channel network configuration consistent with the system and method of the present invention.

FIG. 1 illustrates a typical CCS7 network configuration in which the present invention is incorporated. CCS7, generally referred to as 10, comprises three key signaling points: a Service Switching Point (SSP) 12; a Service Control Point (SCP) 14; and a Signaling Transfer Point (STP) 16. SSPs 12 are located at a central office to provide CCS7 trunk signaling and/or the capability to query a database to determine call routing. The SCPs 14 house databases with call routing information that SSPs and other network elements use to provide advanced services in a telecommunications network. The STPs 16 route CCS7 messages between the signaling points and control access to the CCS7 network.

STPs 16 provide a key function in processing the signaling used in telecommunications. Unlike other nodes in a CCS7 network 10, an STP does not generally act as a source or ultimate destination of CCS7 application messages. The STP functions as both a static and dynamic routing database that controls access to, and directs call signaling between, a variety of CCS7 nodes and networks. The STP monitors, maintains, and reports different levels of information concerning the availability and unavailability of CCS7 nodes, routes, and services.

Figure 2:
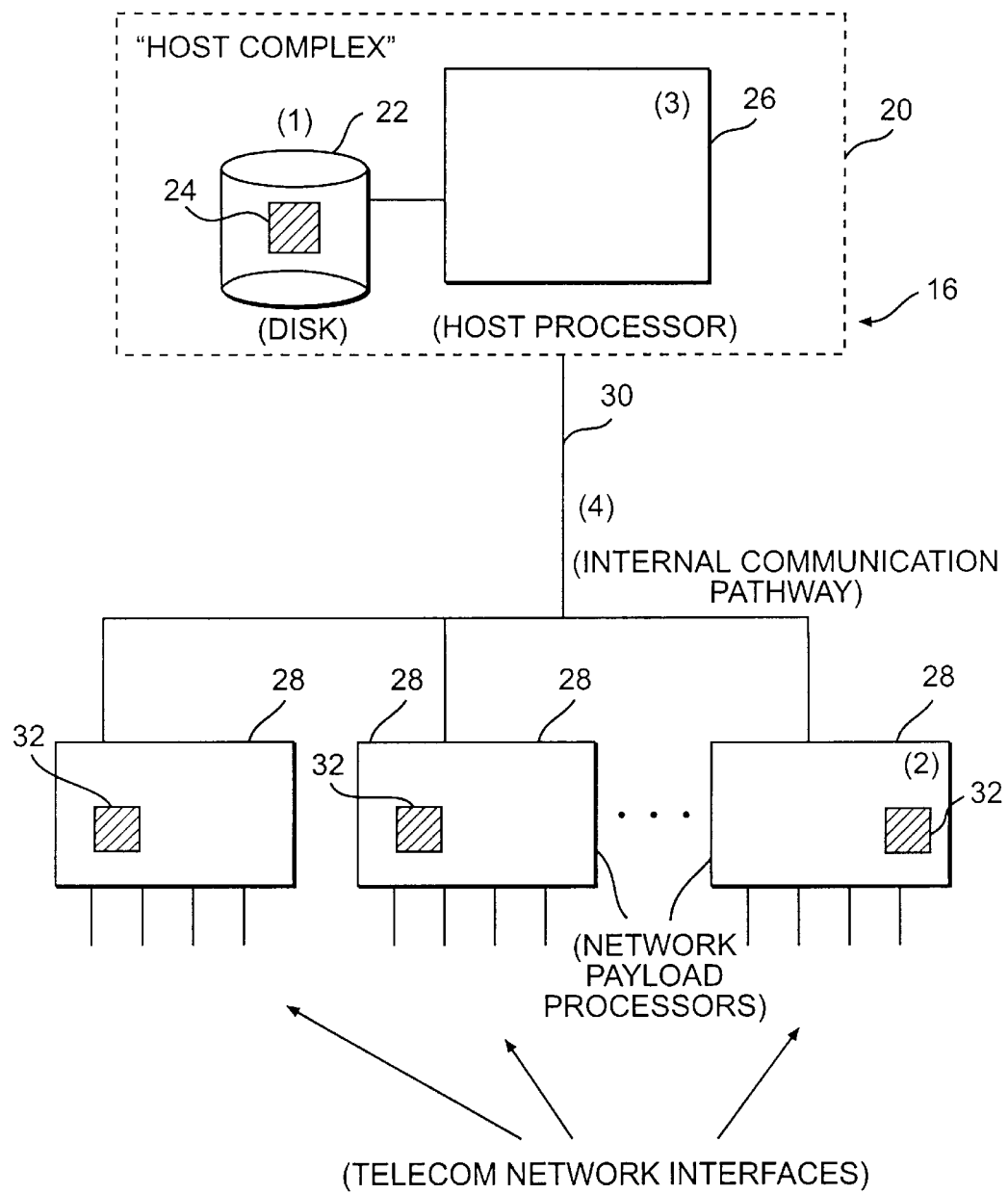
FIG. 2 is a block diagram of a Signal Transfer Point showing the host processor and a plurality of payload processors consistent with the present invention.

FIG. 2 shows that the STP 16 includes a host complex 20 that has a non-volatile storage medium, such as hard disk 22, connected to a host processor 26, for storing a database 24. The host complex 20 is connected to a plurality of network payload processors 28 by internal communication pathways 30. Each of the payload processors 28 includes a database 32 stored in volatile RAM, such as DRAM (not shown).

As mentioned, the technique consistent with the present invention enables the rapid recovery and start-up of payload processors 28 by using the same data format for both host database 24 and real-time database 32. Historically, a host database has been a relatively complex database designed to support user accesses (queries, additions, etc.), while real-time databases were optimized for speed of access along a network traffic path. This conventional approach required a transformation of data and formats between the host and the real-time databases.

In the present technique, a layered architecture employs a self-balancing binary tree implementation on top of a memory manager able to allocate and reference entire database objects. Due to the self-balancing binary tree implementation of data storage, user level access is easily facilitated, i.e., the "key access" based structure supports queries, additions, and other user level commands in a straightforward manner. Due to the specifics of the self-balancing algorithms, the tree is maintained with minimal administrative overhead. Also, the self-balancing aspect of the binary tree provides fast initial access to database elements, while the memory manager provides direct access to each database element for subsequent access. Also, since preferably only two layers are used for the database, the execution of code to perform database operations is efficient. Details of the preferred implementation of this technique are described in the following.

Figure 3:
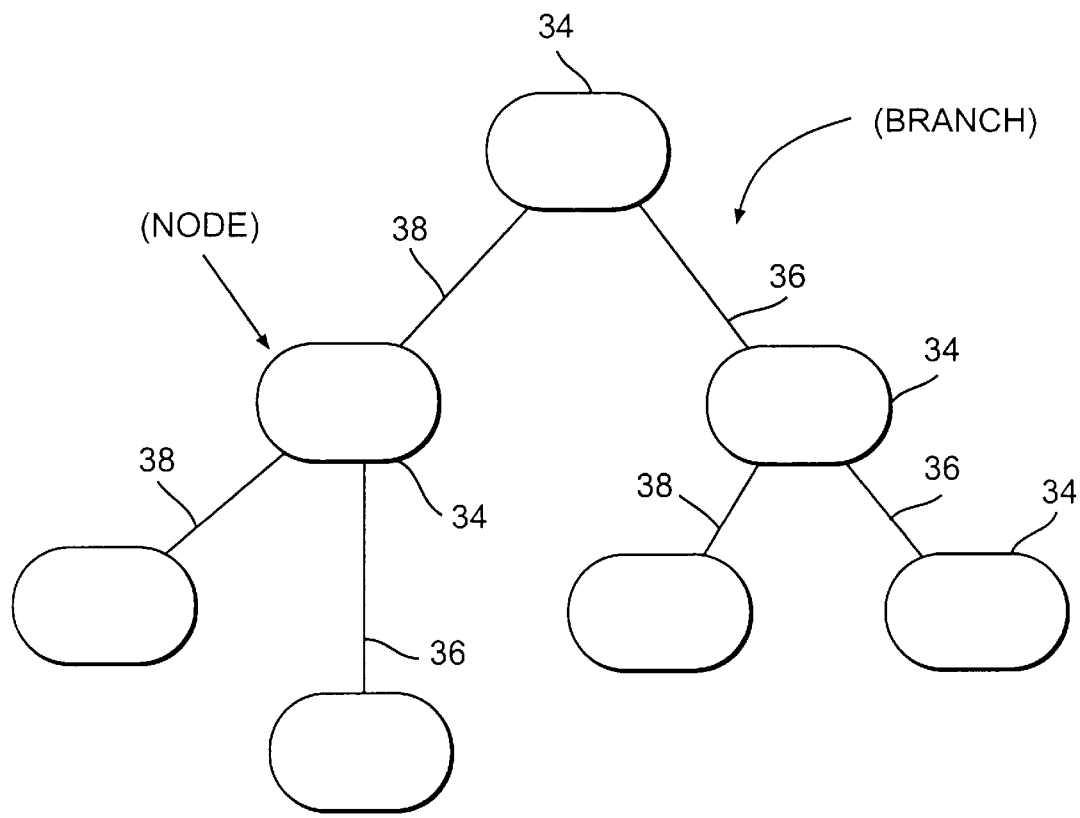
FIG. 3 is a diagrammatic sketch of the fundamental data structure of the database used with the Signal Transfer Point in FIG. 1.

FIG. 3 shows a diagram of the balanced binary tree structure of the databases consistent with the present invention The structure shown is commonly known as a red-black tree having nodes 34, which are connected in a tree configuration by red and black branches 36 and 38, respectively.

As known to those of ordinary skill in the art, a red-black tree is a specific implementation of a binary tree, that has a so-called "color"(either "red" or "black") assigned to each branch in the tree. The "color" is used when inserting items into the tree to keep the tree "balanced", or in other words, to maintain uniform depth across the breadth of the tree. Balancing occurs by determining when to perform local "rotations" of nodes 34, which is a process of disconnecting and reconnecting branches to change the tree height in a given locality without affecting the search properties of the binary tree. For a more detailed description of red-black binary trees, reference is made to a publication entitled "Algorithms" by Robert Sedgewick, published by Addison-Wesley.

The red-black binary tree database achieves space efficiency since a red-black tree requires only one bit per node to store optimally the color plus only two fields to maintain the branches of each node. Each node 34 has a right child 36 and a left child 38 as viewed in FIG. 3. The size required for the two fields is completely determined by the desired maximum size of the database, and is optimally log (base 2) of the maximum database size. Since all binary trees provide searching for data by key values, the red-black tree can support sophisticated queries and updates.

Thus, databases consistent with the present invention can be space efficient with direct access, and keyed lookups, such as might be required in message routing, which is needed by the network payload processors, and can support sophisticated queries and updates, which is needed by the host complex and the network payload processors. Also, the database preferably uses identical architecture on all processors in which it resides.

Figure 4:
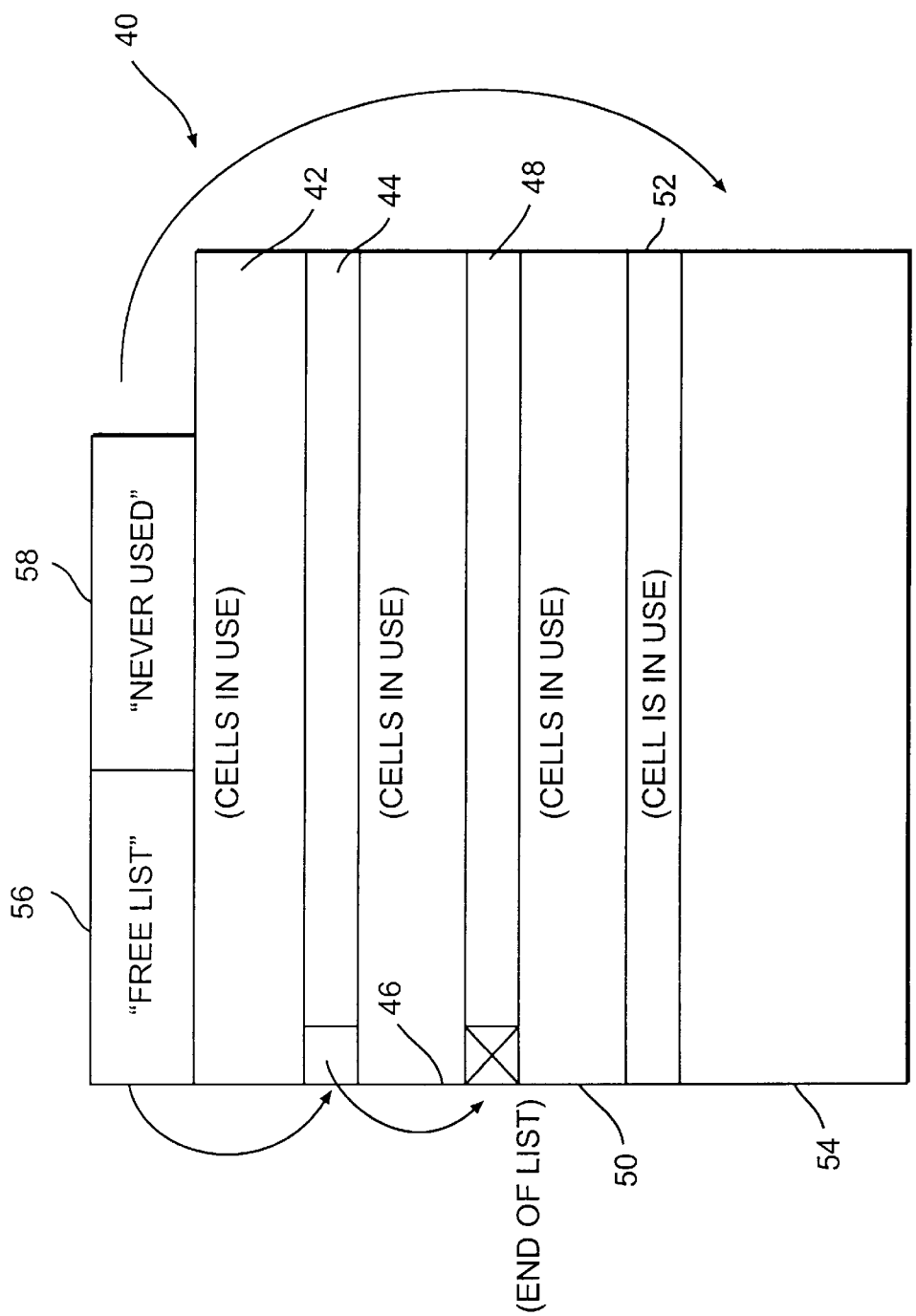
FIG. 4 is a diagram of the cell structure of the database used in the system and method of the present invention.

A memory manager in the host processor and each of the payload processors provides efficient allocation of available memory. FIG. 4 shows a block of storage 40. The block of storage 40 has a plurality of "cells" 42, 44, 46, 48, 50, and 52, a field "Free List" 56, and a field "Never Used" 58. Direct access to data is provided when needed because the content of the red-black tree is stored in a "cell". The content, which is also referred to as a "cell" manager, is an element of an array that is part of the memory manager. The cell manager provides a way of getting directly at a section of memory and managing the allocation and release of the cells.

The cell manager stores N items of K bytes in the cells 42, 46, 50, and 52 to form a block of storage 40 (RAM or disk) that is N*K bytes large, plus the size of two additional fields 56 and 58. "Free List" 56 is a linked list of cells that are not in use at the time. "Never Used" 58 refers to the cell 54 beyond which no cell has ever been used. If the "Free List" is not empty, a new cell is allocated by returning the index of the cell 44 referenced by "Free List" to reference the next cell 48 in the linked list. If the "Free List" is empty, the index is returned to the cell 54 referenced by "Never Used" and the "Never Used" cell increments by one cell.

The cell manager concept is useful since it is extremely efficient in allocating and releasing storage. Also, it can be implemented in both RAM and disk, because all cells are referenced by cell number. Software that makes use of cell numbers can have direct access to their data by simply using a cell number. Another advantage of the cell manager is that it does not require any storage to be initialized in advance. Just the two fields 56 and 58 need to be initialized to Nil.

Figure 5:
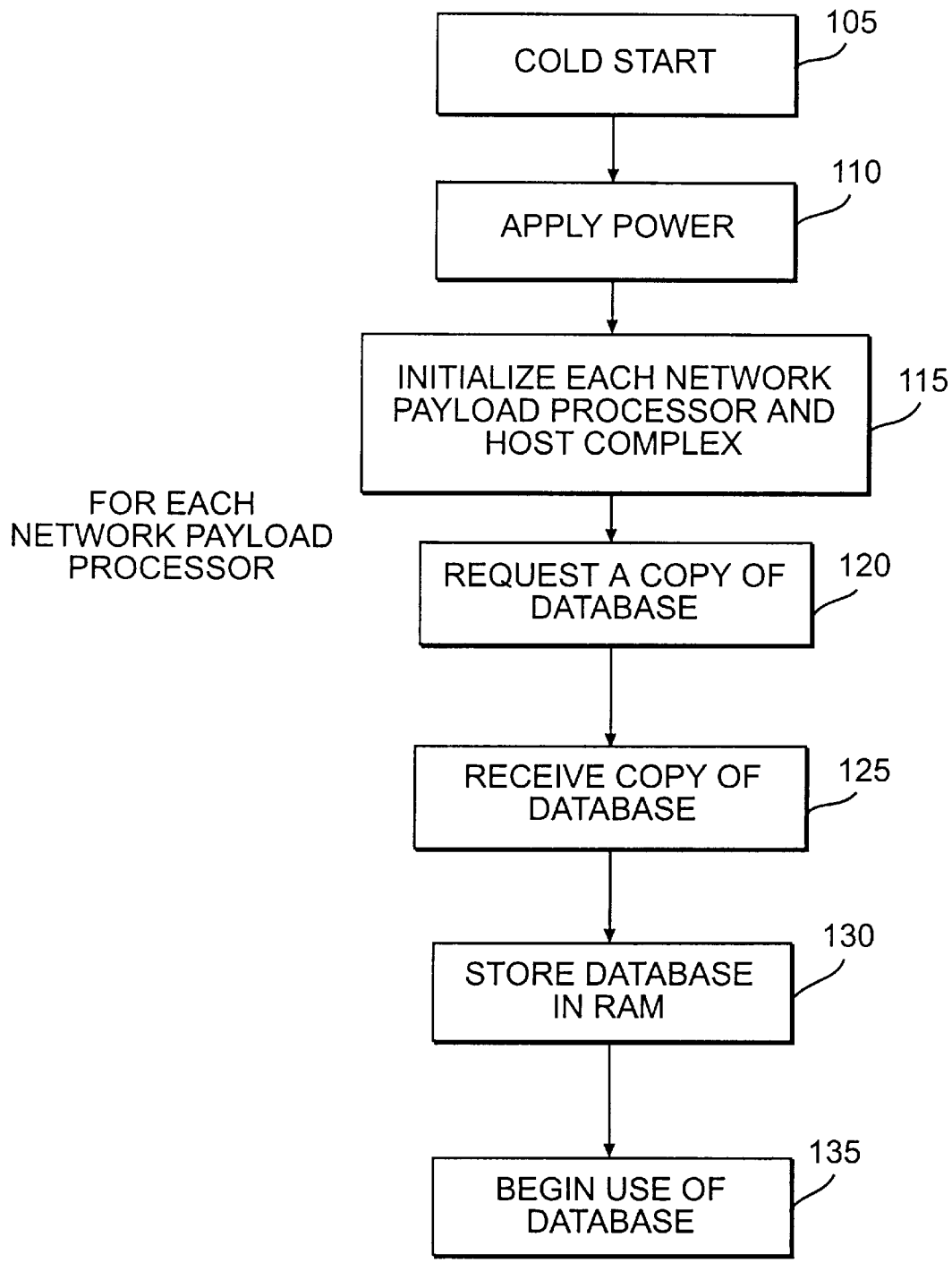
FIG. 5 is a flow chart showing the steps in placing the payload processors of a network in an operating condition consistent with the present invention.

With this understanding of structure, the operation of the system consistent with this invention can be understood using the flow chart 100 of FIG. 5. From a completely cold start (step 105), power is initially applied to the entire system (step 110), each network payload processor and the host complex initializes or boots locally (step 115). This enables the various processors 26 and 28 to begin to form the steps necessary to get the entire system to function as a whole. At this time, the only valid instance of a single database resides on the host disk 22 because the disk is the only persistent medium required in the system. Thus, the instance of the database residing on a hard disk of the host complex is termed "on-Volatile Mission-Ready Database".

Once a network payload processor 28 has completed its local initialization, it then communicates with the host processor 26 over lines 30 to request a copy of the database (step 120). This request is satisfied by the Host processor reading the database image from the disk 22, and transmitting it over lines 30 to the requesting network payload processor 28 in the form stored on the disk 22 (step 125). In comparison with conventional arrangements, that require a transformation of data and formats to go from a host database to a real-time database in payload processors 28, no data transformation is required or necessarily performed in the present technique. The receiving network payload processor then stores the image in its own local volatile RAM memory (step 130) and begins using the database as needed to process network traffic (step 135). All of the network processors 28 initialize in a like manner.

If, during operation of the Signal Transfer Point 16, a single network payload processor should fail because of power outage or other reason, recovery would proceed similar to the complete system recovery process insofar as the one payload processor is concerned. Upon restoration of power to the failed processor, it initializes locally to a given point, then requests its database from the host processor. The host processor then reads the database from disk and transmits it to the requesting network payload processor from the network payload processor perspective, the recovery is the same as a complete system recovery.

Thus, the technique consistent with the present invention overcomes drawbacks in conventional systems for quickly recovering from an outage of an STP. The use of a near identical internal structure for both a disk-resident host database and a real-time database residing in RAM on a link card permits rapid recovery for the STP when sharing data from a non-volatile storage location.

Other embodiments of the invention will be apparent to those skilled in the art from considering the specification and practicing the invention disclosed herein. The specification and examples are considered as exemplary only, with a true scope and spirit of the invention being indicated by the following claims.

What is claimed is:

1. A signaling transfer point (STP) for use in a common channel signaling network, comprising:

a host processor;

a plurality of network payload processors coupled to the host processor via internal communication pathways;

a non-volatile memory accessible to the host processor containing a host database, the host database storing data entries for use in processing signaling traffic in the common channel signaling network;

a plurality of volatile memories each containing a payload database associated with respective ones of the plurality of network payload processors, each of the plurality of payload databases and the host database including a balanced binary tree; and a memory manager included in the host processor and each of the payload processors for storing a copy of the host database from the non-volatile memory of the host processor into the volatile memory of a requesting one of the payload processors.

2. A method of restoring a database to each of a plurality of payload processors coupled to a host processor of a Signal Transfer Point, where each of the plurality of payload processors includes a volatile memory, and the host processor includes a non-volatile memory, the method comprising the steps of:

storing a database having a balanced binary tree format in the non-volatile memory of the host processor, the database containing data entries for use in processing signaling traffic in a common channel signaling network affiliated with the Signal Transfer Point;

applying power to the host processor and each of the plurality of payload processors;

initializing each of the host and payload processors locally to enable each processor to perform steps necessary to get the entire network system to function as a whole;

requesting, by each of the plurality of enabled payload processors, from the enabled host processor a copy of the database stored in the non-volatile memory of the host processor;

reading by the host processor the database from the non-volatile memory and transmitting a copy to the volatile memory of the requesting payload processor; and storing the copy of the database in the volatile memory of the requesting payload processor in the form as stored in the non-volatile memory.

3. The STP of claim 1, wherein the non-volatile memory is a hard disk.

4. The method of claim 2, wherein the step of storing the database in the non-volatile memory includes the substep of: storing the database on a hard disk.

5. The STP of claim 1 wherein the database of the data base accessible to the host processor and each of the payload processors is a database structure of the red-black tree type.

6. The STP of claim 2 wherein the step of storing the database in the non-volatile memory comprises the substep of installing a data base structure of the red-black tree type.

7. The STP of claim 1 wherein the memory manager comprises a cell manager including a block of storage that is N*K bytes large plus a "Free List" field and a "Never Used" field.

8. The method of claim 2 wherein the step of storing the database comprises storing the database in a cell including a block of storage that is N*K bytes large plus a "Free List" field and a "Never Used" field.

9. A method of starting an STP having a host processor and a plurality of network payload processors coupled to the host processor, the method comprising the steps of:

storing a database having a balanced binary tree format in a non-volatile memory of the host processor, the database containing data entries for use in processing signaling traffic in a common channel signaling network affiliated with the STP;

applying power to the host processor and each of the plurality of payload processors;

initializing each of the host and payload processors locally to enable the processors to perform steps necessary to get the entire network system to function as a whole;

requesting, by each of the plurality of enabled payload processors, from the enabled host processor, a copy of the database stored in the non-volatile memory of the host processor;

reading by the host processor the database from the non-volatile memory and transmitting it to the requesting payload processor in the form stored in the non-volatile memory; and storing the copy of the database in the volatile memory of the requesting payload processor.

10. The method of claim 9 wherein the step of storing the database in the non-volatile memory comprises storing a data base structure of the red-black tree type.

11. The method of claim 9 wherein the step of storing the database comprises storing the database in a cell including a block of storage that is N*K bytes large plus a "Free List" field and a "Never Used" field.

12. The method of claim 9, wherein the step of storing the database in the non-volatile memory comprises the substep of: storing the database on a hard disk.

* * * * *